(12) United States Patent
Liao et al.

(10) Patent No.: US 7,755,614 B2
(45) Date of Patent: Jul. 13, 2010

(54) MOTION DETECTION SYSTEM AND MOTION DETECTION METHOD

(75) Inventors: Tung-Tsai Liao, Hsin Chu (TW);
Jui-Wen Huang, Hsin Chu (TW)

(73) Assignee: Sunplus Technology Co., Ltd., Hsin-chu (TW)

( * ) Notice: Subject to any disclaimer, the term of this patent is extended or adjusted under 35 U.S.C. 154(b) by 793 days.

(21) Appl. No.: 11/599,449

(22) Filed: Nov. 15, 2006

(65) Prior Publication Data

US 2007/0124674 A1 May 31, 2007

(30) Foreign Application Priority Data

Nov. 30, 2005 (TW) .............................. 94141998 A

(51) Int. Cl.
*G06F 3/041* (2006.01)
(52) U.S. Cl. ..................................... 345/173
(58) Field of Classification Search .......... 345/173–179
See application file for complete search history.

(56) References Cited

U.S. PATENT DOCUMENTS 4,567,470 A * 1/1986 Yoshikawa et al. ............ 341/33
5,365,461 A * 11/1994 Stein et al. ................... 700/298
2004/0215853 A1* 10/2004 Marx et al. .................... 710/69
2006/0055416 A1* 3/2006 Kinoshita et al. ........... 324/658

* cited by examiner

*Primary Examiner*—Amr Awad
*Assistant Examiner*—Jarurat Suteerawongsa
(74) *Attorney, Agent, or Firm*—Muncy, Geissler, Olds, & Lowe, PLLC

(57) ABSTRACT

A motion detection system is disclosed. The invention comprises a touch panel, a plurality of switching units, a detection unit and a control unit. The touch panel comprises a plurality of metal sensors, each of which in turn is set as a detecting sensor. Each switching unit is electrically connected to a corresponding metal sensor respectively for switching voltage. During a charge stage, the detection unit calculates the discharge time of the detecting sensor and generates a detection result signal. The control unit generates a motion signal according to the detection result signal generated by the detection unit. Based on the capacitive effect and simple hardware architecture, the invention can be employed in option or orientation control by detecting a human hand's movement on the touch panel.

13 Claims, 7 Drawing Sheets

MOTION DETECTION SYSTEM AND MOTION DETECTION METHOD

This application claims the benefit of the filing date of Taiwan Application Ser. No. 094141998, filed on Nov. 30, 2006, the content of which is incorporated herein by reference.

BACKGROUND OF THE INVENTION

1. Field of the Invention

The invention relates to a touch panel, and particularly to a system and method for motion detection.

2. Description of the Related Art

Generally, each human body has different equivalent capacitance value to the ground. Therefore, when a human's finger is touching a key or a metal pad disposed on a touch panel, the effective capacitance value of the metal pad touched by the finger varies. Even though the human's body does not contact the touch panel, some parasitic capacitance is still generated inside the touch panel circuit. Many conventional touch panels utilize the feature of the above-mentioned capacitive effect to determine if a human's body gets close to or even touches a key or a metal pad on the touch panel according to the number of charge and discharge cycles of the stray capacitors.

FIG. 1 illustrates a schematic diagram of a conventional motion detection system. FIG. 2 illustrates a flow chart of a conventional motion detection method.

Referring to FIG. 1, the conventional motion detection system 100 includes a timing controller 120, a plurality of metal pads 101~10N (where N>1 and N is a positive integer), a counter 130, a plurality of switches 151~15N, and a control unit 140. The timing controller 120 generates a plurality of control signals to the switches 151~15N for controlling the switching positions. On condition that nobody touches those metal pads, the switch related to one of the metal pads (such as the metal pad 101) is first connected to a high voltage $V_{cc}$ and the switches 152~15N related to the other metal pads 10$n$ (where n is a positive integer and $2 \leq n \leq N$) are grounded. At this moment, the parasitic capacitor $C_{12}$ exists between the metal pad 101 and the metal pad 102 and is charged by the high voltage $V_{cc}$. Next, the switch 151 (or the metal pad 101) is floated so that the parasitic capacitor $C_{12}$ discharges through a corresponding resistor R (not shown). During a predetermined period T, the above-mentioned steps are repeated until the average number $M_{ref}$ of the charge and discharge cycles is recorded. On the other hand, if a human's finger is touching or close to the metal pad 101, parasitic capacitors $C_1$~$C_N$ with different capacitance values are generated between the metal pad 101 and the other metal pads so as to change the effective capacitance value of the metal pad 101, finally influencing the number of the charge and discharge cycles of the metal pad 101. Wherein, the voltage $V_b$ is a ground voltage that the human body touches.

Referring to FIG. 2, the conventional motion detection method comprises the steps as follows. First, in step S201, the average number $M_{ref}$ of the charge and discharge cycles is calculated and then recorded during the predetermined period T if it is assured that nobody touches the metal pads. Then, in step S202, the number of the charge and discharge cycles for each metal pad is likewise calculated during the predetermined period T on condition that it is unknown whether anybody is touching the metal pads. Subsequently, in step S203, the numbers $M_1$~$M_N$ of the charge and discharge cycles for the metal pads are respectively compared with the average number $M_{ref}$ in order to determine respectively if the differences between the numbers $M_1$~$M_N$ and the average number $M_{ref}$ are large enough to indicate that somebody is touching or close to the metal pads. If it is assured that somebody is touching one of the metal pads, the system will perform the related processing in step S204. If not, the flow returns to the step S202.

However, with respect to the conventional motion detection technique, the effective capacitance values (or capacitive effect) are significantly interfered by either external noises or external environmental factors while detecting. Meanwhile, due to the different effective capacitance value for each individual and incapable of making real-time dynamic calibration, the traditional motion detection technique causes the problems of unsatisfactory accuracy and high correlation between individuals.

SUMMARY OF THE INVENTION

In view of the above-mentioned problems, an object of the invention is to provide a motion detection system having high noise-resistance using simple hardware disposition.

To achieve the above-mentioned objective, the motion detection system comprises a touch panel, a plurality of switching units, a detection unit and a control unit. The touch panel comprises a plurality of metal sensors, each of which in turn is set as a detecting sensor. Each switching unit is electrically connected to a corresponding metal sensor respectively for either floating or for connecting the metal sensor to a first voltage or a second voltage according to a control signal. During a charge stage, the detecting sensor is connected to the first voltage with the other metal sensors being connected to the second voltage. The detecting sensor is floated while the other metal sensors are connected to the first voltage during a detecting stage. The detection unit calculates the discharge time of the detecting sensor and generates a detection result signal during the detecting stage according to the state of the control signal, the voltage of the detecting sensor and a predetermined reference voltage. The control unit generates the predetermined reference voltage, the control signal and a motion signal according to the detection result signal generated by the detection unit.

Another objective of the invention is to provide a motion detection method applied to a touch panel for generating a motion signal, wherein the touch panel having a plurality of metal sensors is employed as an input device, the method comprising: setting each of a plurality of metal sensors in turn as a detecting sensor; connecting the detecting sensor to a first voltage and the other metal sensors to a second voltage; floating the detecting sensor, connecting the other metal sensors to the first voltage and calculating discharge time of the detecting sensor to generate a detection result signal according to the voltage of the detecting sensor and a predetermined reference voltage; and generating the motion signal according to the detection result signal.

Based on the capacitive effect, the invention compares the natural discharge phenomenon of the touch panel with the discharge phenomenon of the touch panel being touched by a human's finger in order to detect the movement of the human's finger on the touch panel. One feature of the invention is to float the detecting sensor and simultaneously connect the other metal sensors to a high voltage $V_{cc}$ during the detecting stage. At this moment, if somebody is touching the detecting sensor, the parasitic capacitors surrounding the detecting sensor are charged by the other metal sensors having the high voltage $V_{cc}$ so that the parasitic capacitors become effective and the overall noise-resistance is increased. Another feature of the invention is to dynamically adjust the average discharge time reference value $T_{ref}$ and the predetermined reference voltage $V_{ref}$, according to the discharge time $T_{con}$, of each detecting sensor. The invention compensates the influence of the external environmental factors, such as the different effective capacitance value for each individual or the background difference of the measuring environments, thereby avoiding malfunction or mis-trigger.

DETAILED DESCRIPTION OF THE INVENTION

The system and method for motion detection of the invention will be described with reference to the accompanying drawings.

Figure 1:
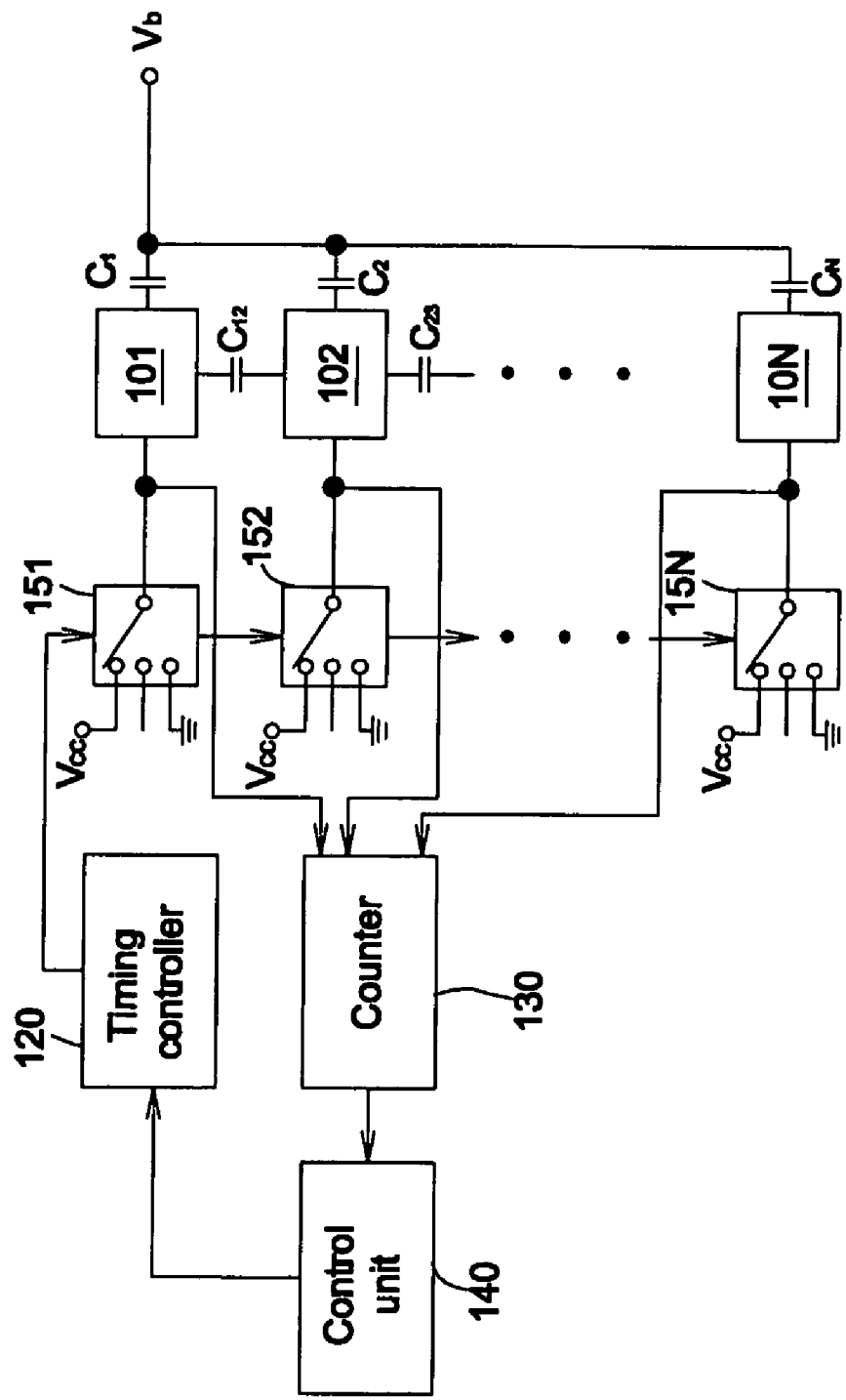
FIG. 1 shows a schematic diagram illustrating a conventional motion detection system.
Figure 2:
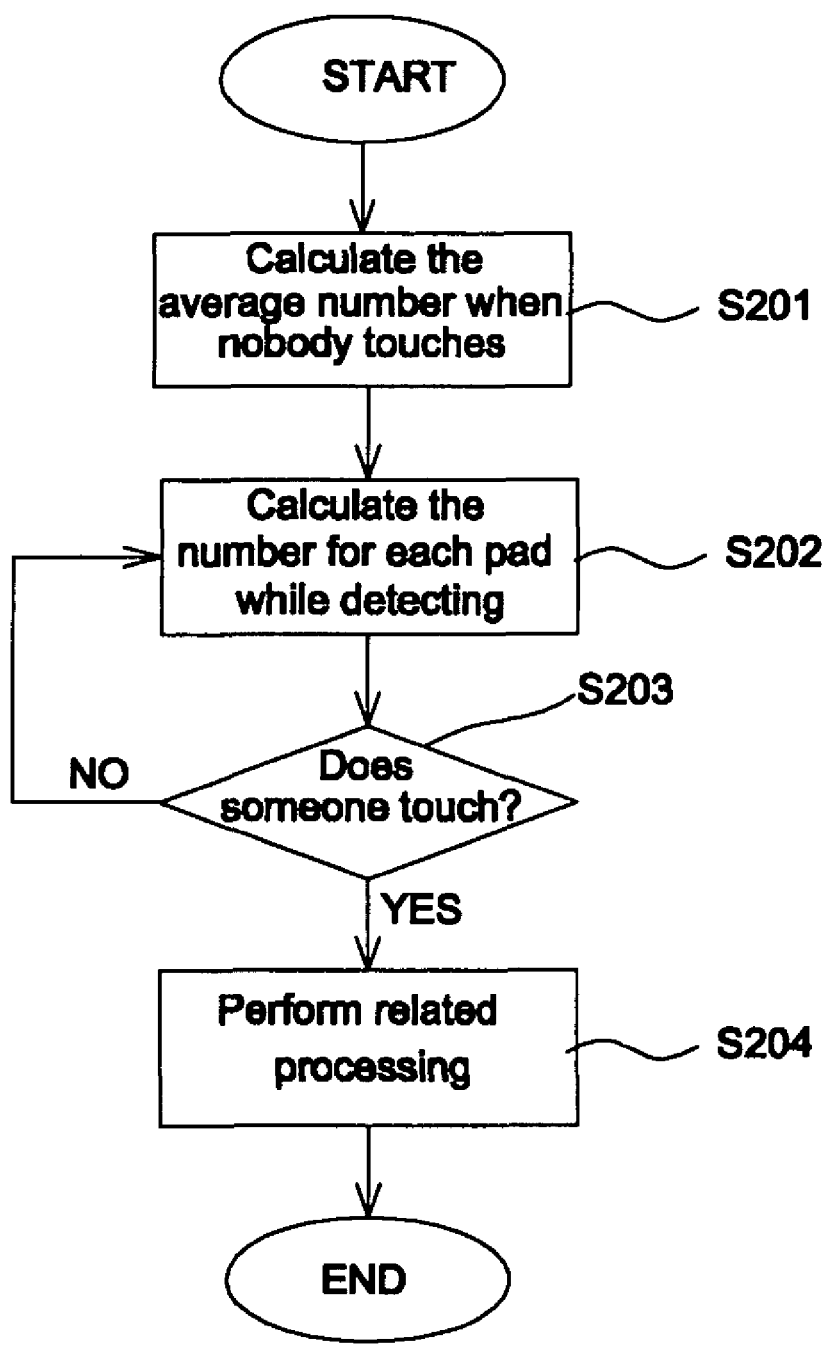
FIG. 2 shows a flow chart illustrating a conventional motion detection method.
Figure 3A:
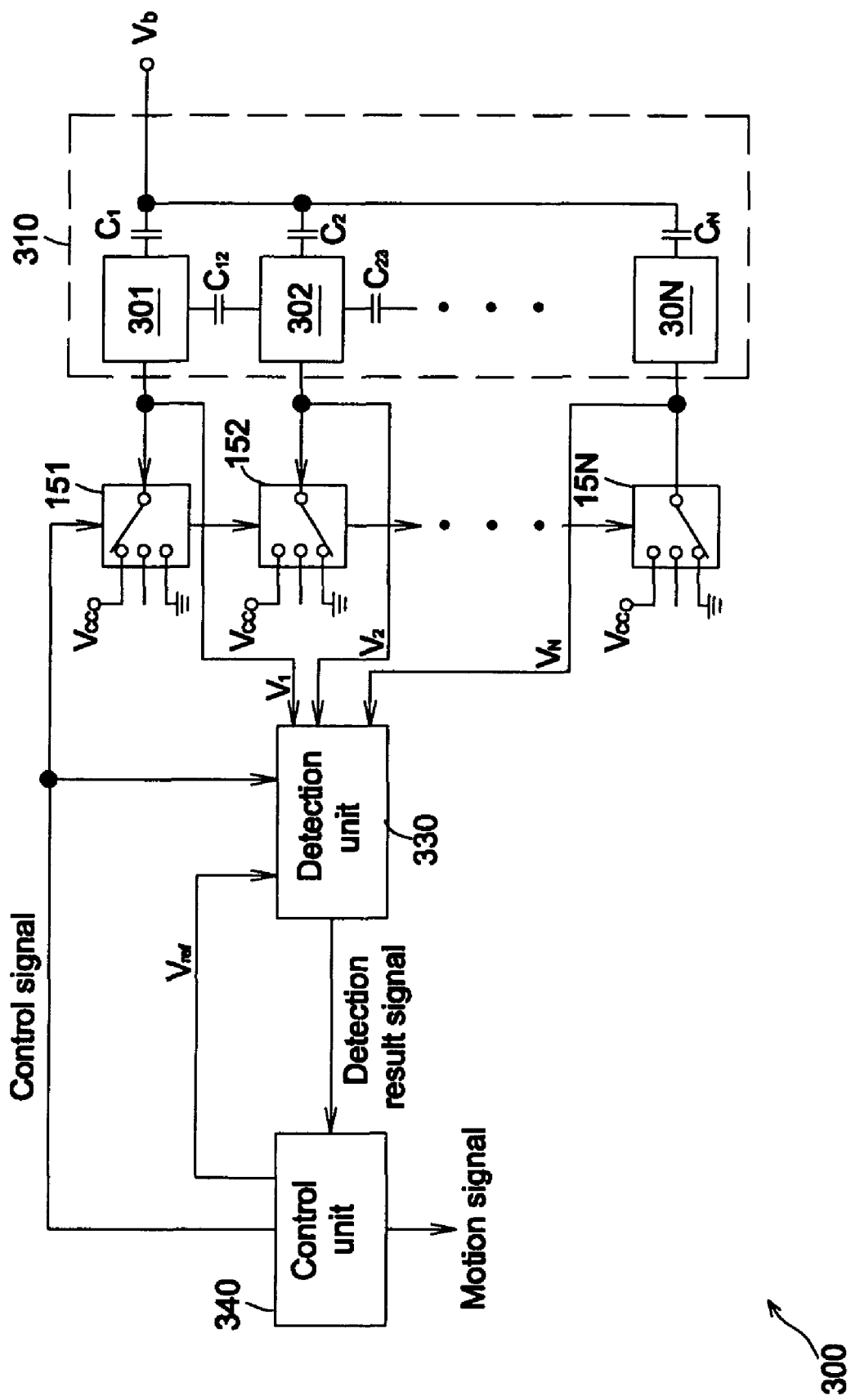
FIG. 3A shows a schematic block diagram illustrating a motion detection system according to the invention.

FIG. 3A shows a schematic block diagram illustrating a motion detection system according to the invention. Referring to FIG. 3A, the motion detection system 300 according to the invention comprises a touch panel 310, a plurality of switching units 151~15N ($N \geq 2$ and N is a positive integer), a detection unit 330, and a control unit 340. The touch panel 310 comprises a plurality of metal sensors 301~30N, each of which in turn is set as a detecting sensor while in operation. Each of the switching units 15n ($1 \leq n \leq N$ and n is a positive integer) is electrically connected to a corresponding metal sensor and then the metal sensor is either floated or electrically connected to an operating voltage $V_{cc}$ or a ground voltage GND according to a control signal. While a metal sensor is being set as a detecting sensor, a switching unit related to the detecting sensor connects the detecting sensor to the operating voltage $V_{cc}$ during a charge stage. Meanwhile, the other switching units connect the corresponding metal sensors to the ground voltage GND respectively. During a detecting stage, the switching unit related to the detecting sensor floats the detecting sensor, whereas the other switching units connect the corresponding metal sensors to the operating voltage $V_{cc}$ respectively. According to the state of the control signal, the voltage of detecting sensor, and a predetermined reference voltage $V_{ref}$, the detection unit 330 calculates the discharge time period $T_{con}$ of the detecting sensor and thereby generates a detection result signal during the detecting stage. In addition to the predetermined reference voltage $V_{ref}$ and the control signal, the control unit 340 also generates a motion signal according to the detection result signal provided by the detection unit 330.

In the case of setting the metal sensor 301 as the detecting sensor, all of the metal sensors are connected to the ground voltage GND except that the metal sensor 301 is connected to the operating voltage $V_{cc}$. If nobody touches the metal sensor 301, the metal sensor 301 connected to the operating voltage $V_{cc}$ will charge the parasitic capacitor $C_{12}$ only. Contrarily, if somebody is touching the metal sensor 301, the metal sensor 301 connected to the operating voltage $V_{cc}$ will charge both the parasitic capacitors $C_1$ and $C_{12}$ simultaneously (suppose that the parasitic capacitors $C_1 \sim C_N$ with different capacitance values are generated between the metal sensor 301 and each of the metal sensors 302~30N while a human's hand is touching or close to the metal sensor 301). The parasitic capacitor $C_2$ is hardly effective and thus the noise interference becomes relatively large. During a detecting stage, the metal sensor 301 as the detecting sensor is floated while the other metal sensors 302~30N are connected to the high voltage level $V_{cc}$. At this time, if nobody touches the metal sensor 301, the metal sensor 302 connected to the high voltage level $V_{cc}$ will charge the parasitic capacitor $C_{12}$ only. However, if somebody is touching the metal sensor 301, the metal sensor 302 with the high voltage level $V_{cc}$ will now charge parasitic capacitors $C_1$, $C_2$, and $C_{12}$. Since the parasitic capacitor $C_2$ becomes effective, the overall noise resistance is significantly improved.

There are two embodiments for implementing the detection unit 330. In a first embodiment, the detection unit 330 includes a plurality of voltage detectors (not shown) connected to the metal sensors respectively, and each voltage detector activates its detecting function according to the state of the control signal. FIG. 3C illustrates a second embodiment. In the second embodiment, the detection unit 330 comprises a multiplexer 332 and a voltage detector 331 where the input terminal of the voltage detector 331 is connected to the output terminal of the multiplexer 332. As illustrated in FIG. 3C, the input terminals of the multiplexer 332 are connected to the metal sensors respectively and the voltage of the detector sensor is outputted according to the state of the control signal.

Based on Kirchhoff's loop theorem, while discharging, the voltage of the detecting sensor van be derived as follows:

$$i \times R + \frac{q}{C_{eq}} = 0 \Rightarrow \int \frac{dq}{q} = \int -\frac{dt}{RC_{eq}} \Rightarrow q = B e^{-t/RC_{eq}}$$

When $t = 0$, $q = q_0 = \epsilon C_{eq}$, $$B = \epsilon C_{eq} \Rightarrow q = \epsilon C_{eq} e^{-t/RC_{eq}} \Rightarrow V_{con} = \frac{q}{C_{eq}} = \epsilon \times e^{-t/RC_{eq}}$$

$C_{eq}$ is the equivalent capacitance value of the metal sensors and varies with either whether somebody touches the metal sensor or the background of the measuring environment, where $\epsilon = V_{cc}$. One end of the discharge resistor R (not shown) is connected to each metal sensor while the other end of the discharge resistor R is grounded (the second voltage). During the detecting stage, while $t=0$, the detecting sensor starts to discharge and the voltage $V_{con}$ of the detecting sensor is equal to $\epsilon$. Obviously, the larger the equivalent capacitance value of the detecting sensor, the lower the voltage $V_{con}$. As each metal sensor in turn is set as a detecting sensor and thereafter the voltage of the detecting sensor discharges from $V_{con} = \epsilon$ down to $V_{con} = V_{ref}$, the discharge time of each individual metal sensor is recorded respectively and then averaged to obtain the average discharge time reference value $T_{ref}$ for each detecting sensor.

According to the invention, if it is assured that nobody is touching the metal sensors, the average discharge time reference value $T_{ref}$ for each detecting sensor is calculated first. During the charge stage, the detecting sensor is connected to an operating voltage $V_{cc}$ (the first voltage) and the other metal sensors are connected to a ground voltage GND (the second voltage). Next, during the detecting stage, the detecting sensor is floated; meanwhile, the other metal sensors are connected to the operating voltage $V_{cc}$ (the first voltage) and the average discharge time reference value $T_{ref}$ for each detecting sensor is then calculated according to the voltage of the detecting sensor and a predetermined reference voltage $V_{ref}$.

On condition that it is unknown whether anybody is touching the metal sensors, at the beginning of the detecting stage, the detection unit 330 respectively calculates, in turn, the discharge time period $T_{con}$ for each detecting sensor which discharges down to the predetermined reference voltage $V_{ref}$. Based on whether the time differences between the discharge time periods $T_{con}$ for the metal sensors and the average discharge time reference value $T_{ref}$ are greater than a threshold time period $T_{th}$ (error range), the detection unit 330 determines if somebody is touching the metal sensors. If any of the time differences between the discharge time periods $T_{con}$ related to the detecting sensors respectively and the average discharge time reference value $T_{ref}$ are larger than the threshold time period $T_{th}$, it indicates that a human body is touching at least one of the metal sensors and the detection unit 330 will enable the detection result signal. On the other hand, if all the time differences between the discharge time periods $T_{con}$ related to the detecting sensors respectively and the average discharge time reference value $T_{ref}$ are less than the threshold time period $T_{th}$, it indicates that nobody is touching the metal sensors and the detection unit 330 will disable the detection result signal. In the meantime, the motion detection system 300 adjusts the average discharge time reference value $T_{ref}$ and the predetermined reference voltage $V_{ref}$ according to the discharge time periods $T_{con}$ related to the detecting sensors respectively. By virtue of the influence of the external environmental factors, such as the different equivalent capacitance value for each individual or the background difference of the measurement environment, the average discharge time reference value $T_{ref}$ and the predetermined reference voltage $V_{ref}$ need to be dynamically adjusted to prevent from malfunction or mis-trigger.

Figure 3B:
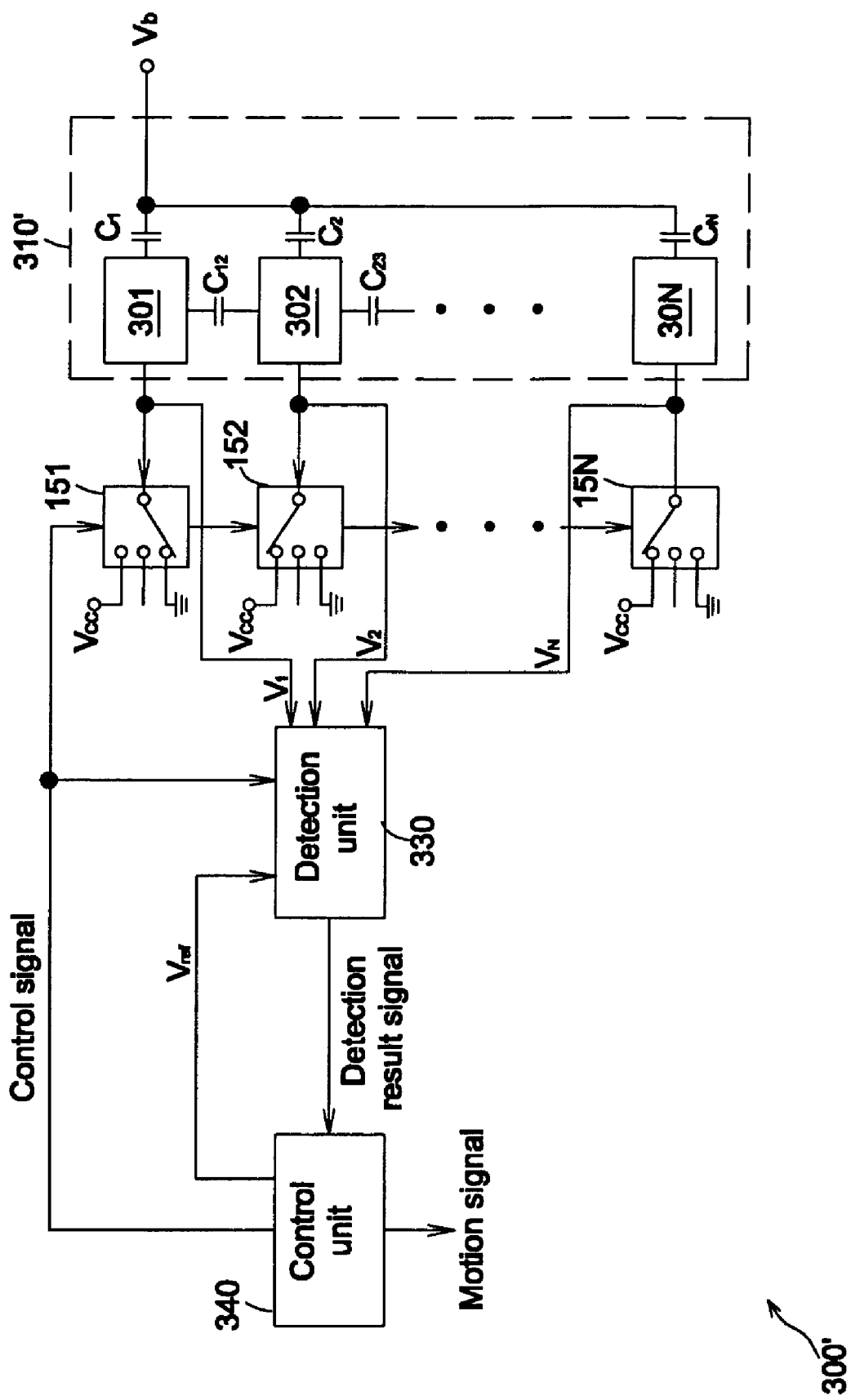
FIG. 3B illustrates the schematic block diagram of the motion detection system according to another embodiment of the invention.
Figure 3C:
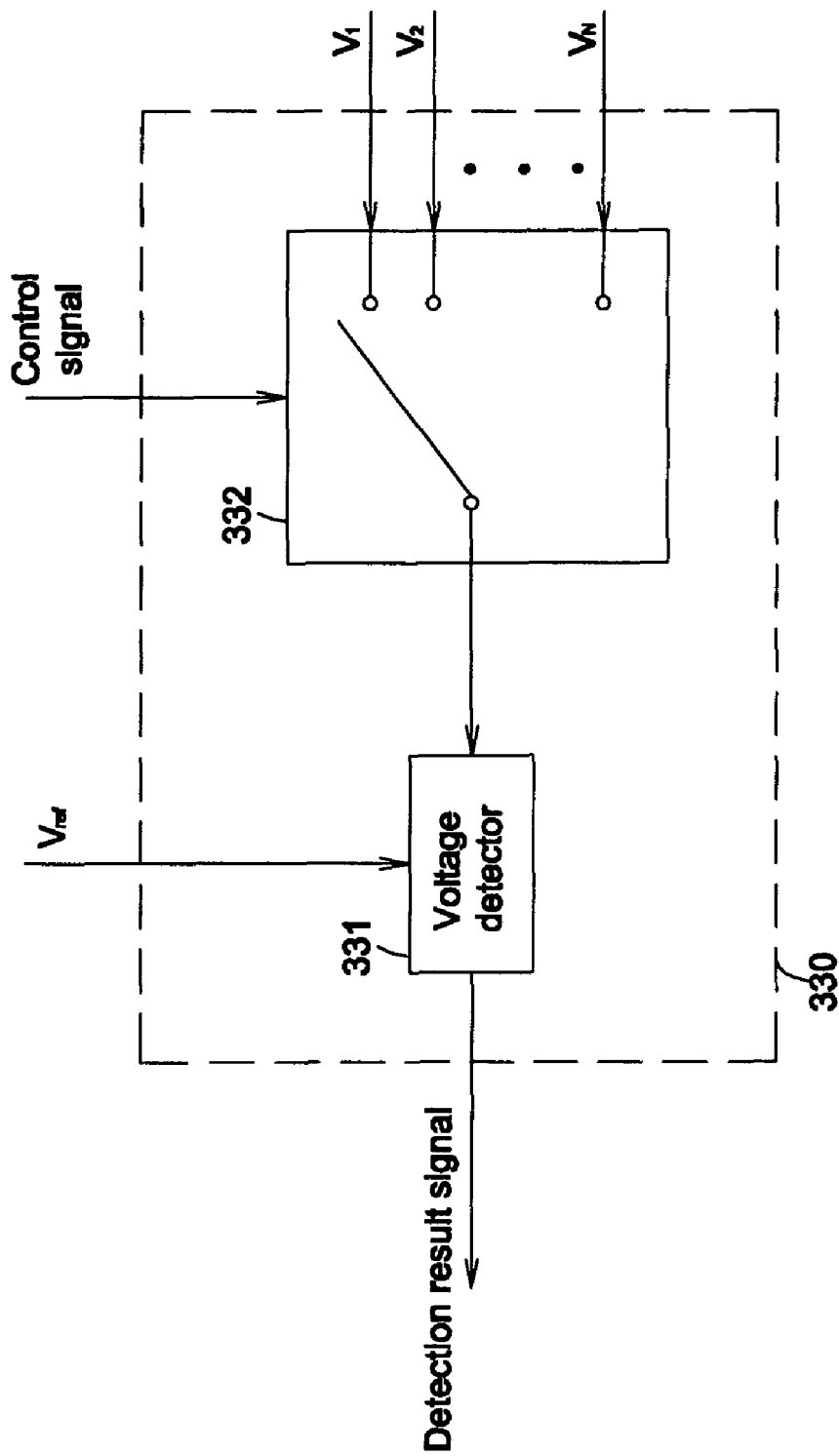
FIG. 3C shows a schematic block diagram illustrating a detection unit according to the invention.

FIG. 3B illustrates the schematic block diagram of the motion detection system according to another embodiment of the invention. The operations of the motion detection system 300' of FIG. 3B is basically the same as those of the motion detection system 300 of FIG. 3A except that the detecting sensor is grounded via the corresponding switching unit and the other metal sensors are connected to the operating voltage $V_{cc}$ via the corresponding switching units during the charge stage in the motion detection system 300' of FIG. 3B. Afterwards, during the detecting stage, the detecting sensor is floated via the corresponding switching unit while the other metal sensors are grounded via the corresponding switching units. Since the other operations performed in the motion detection system 300' and in the motion detection system 300 are the same, the description is omitted here. Hence, both the charge direction and the discharge direction of the capacitors in motion detection system 300' are completely opposite to those of the capacitors in the motion detection system 300.

Figure 4A:
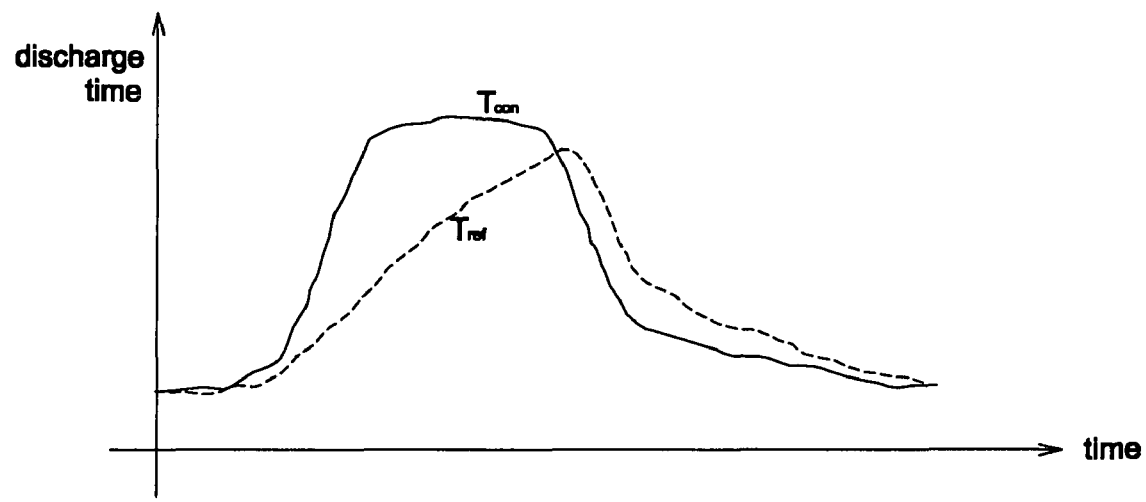
FIG. 4A shows the results of an experiment comparing the discharge time period curve $T_{con}$ with the dynamically adjusted the average discharge time reference value curve $T_{ref}$ according to the invention.
Figure 4B:
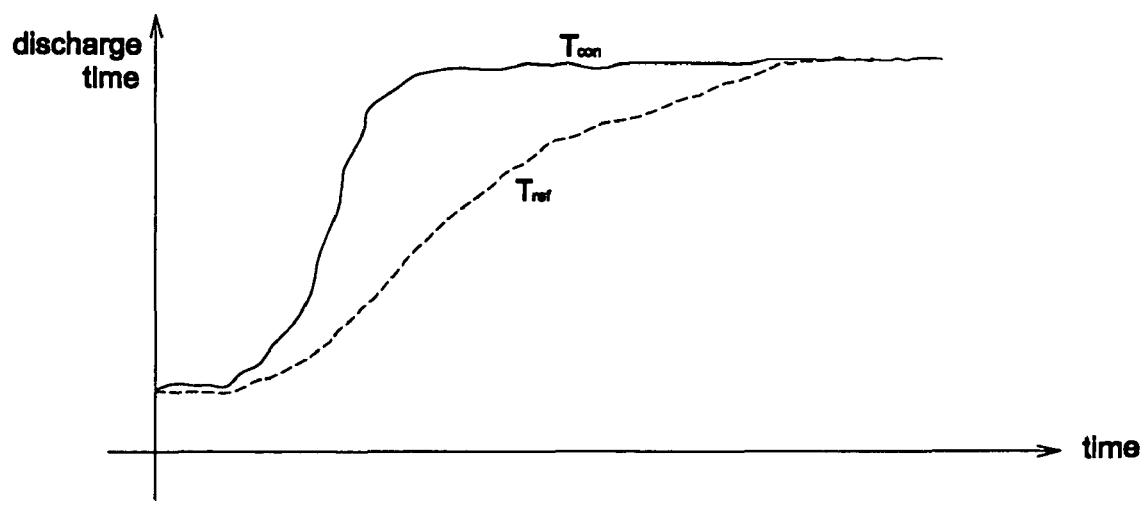
FIG. 4B shows the results of another experiment comparing the discharge time curve $T_{con}$ with the dynamically adjusted the average discharge time reference value curve $T_{ref}$ according to the invention.

FIG. 4A shows the results of an experiment comparing the discharge time period curve $T_{con}$ with the dynamically adjusted the average discharge time reference value curve $T_{ref}$ according to the invention. FIG. 4B shows the results of another experiment comparing the discharge time curve $T_{con}$ with the dynamically adjusted the average discharge time reference value curve $T_{ref}$ according to the invention.

Refering to FIG. 4A, when a human's body gets close to the touch panel, the equivalent capacitance value $C_{eq}$ of the metal sensors increases, and thereafter the discharge time period $T_{con}$ is enlarged. The motion detection system 300 dynamically adjusts the discharge time reference value curve $T_{ref}$ according to the discharge time period curve $T_{con}$, where the average discharge time reference value curve $T_{ref}$ rises slowly and drops fast. According to the features of the average discharge time reference value curve $T_{ref}$, after somebody has put his hand on the metal sensors for a long enough period of time, the average discharge time reference value curve $T_{ref}$ will be adjusted to coincide with the discharge time period curve $T_{con}$ (as shown in FIG. 4B). In this case, since there is no difference between these two curves, the detection unit 330 will mistakenly determine that nobody is touching the metal sensors.

In the motion detection system 300, each of the enable periods of the control signals is separate and non-overlapping so as to be individually set to measure the charge and discharge time of the detecting sensor. The metal sensors can be implemented using metal pads, metal keys or ordinary I/O pins.

Figure 5:
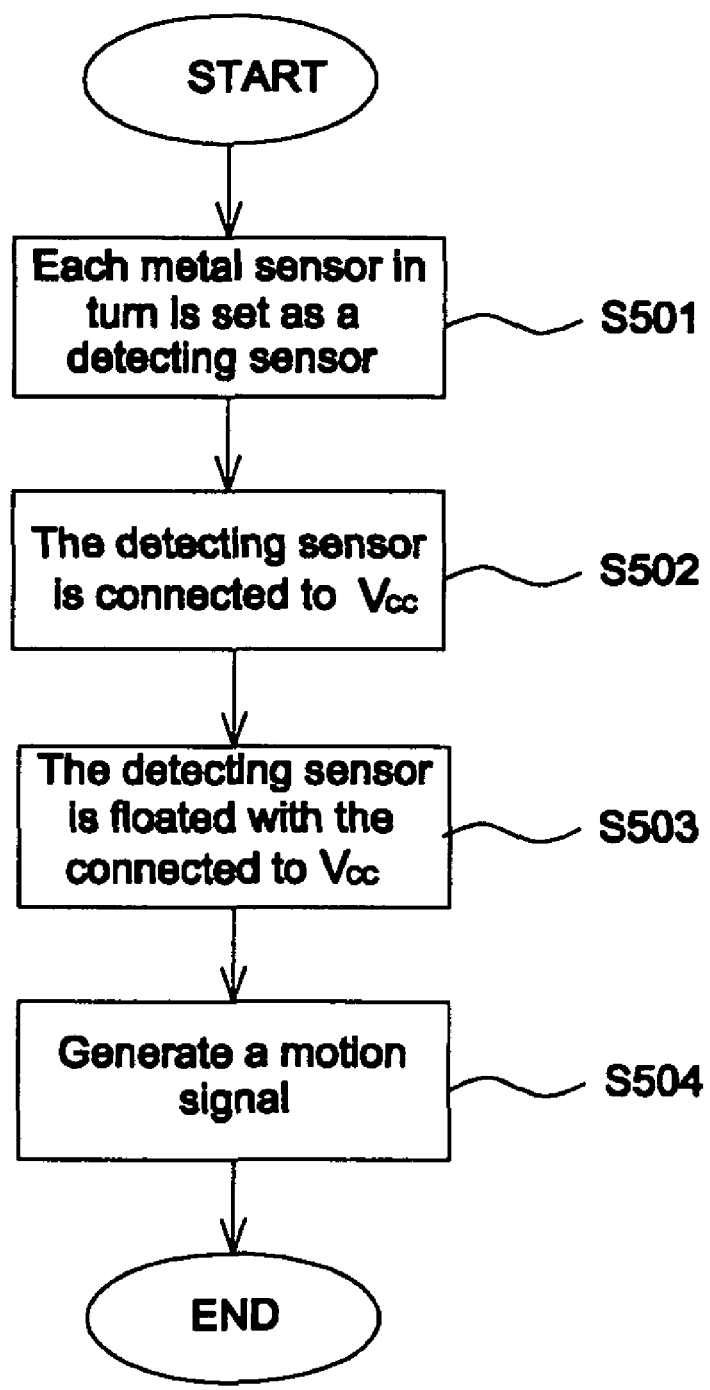
FIG. 5 shows a flow chart of the motion detection method according to the invention.

FIG. 5 is a flow chart of the motion detection method according to the invention. The motion detection method of the invention utilizes a touch panel 310, comprising a plurality of metal sensors 301~30N, as an input device for generating a motion signal. The motion detection method comprises the following four steps. Firstly, in step S501, each of the metal sensors 301~30N in turn is set as a detecting sensor. Then, in step S502, the detecting sensor is connected to an operating voltage $V_{cc}$ (the first voltage) while the other metal sensors are connected to a ground voltage GND (the second voltage). Suppose that the metal sensor 301 is currently set as a detecting sensor. At this time, if nobody touches the metal sensors, only the parasitic capacitor $C_{12}$ is charged by the high voltage $V_{cc}$. However, if somebody is touching the metal sensor 301, the metal sensor 302 with the high voltage level $V_{cc}$ will charge both the parasitic capacitors $C_1$, and $C_{12}$ simultaneously (suppose that the parasitic capacitors $C_1$~$C_N$ with different capacitance values are generated between the metal sensor 301 and each of the metal sensors 302~30N while the human hand is touching or close to the metal sensor 301). The parasitic capacitor $C_2$ is hardly effective. It is because the metal sensor 301 is at a high voltage level and the other metal sensors are grounded. Accordingly, the noise interference becomes relatively severe.

Next, in step S503, the detecting sensor is floated while the other metal sensors 302~30N are connected to the high voltage level $V_{cc}$. The discharge time periods $T_{con}$ related to the detecting sensors is calculated to generate a detection result signal based on the voltage of the detecting sensor and a predetermined reference voltage $V_{ref}$. At this time, if nobody touches the metal sensor 301, the metal sensor 302 connected to the high voltage level $V_{cc}$ will charge the parasitic capacitor $C_{12}$ only. However, if somebody is touching the metal sensor 301, the metal sensor 302 with the high voltage level $V_{cc}$ will now charge the parasitic capacitors $C_1$, $C_2$, and $C_{12}$. Since the parasitic capacitor $C_2$ becomes effective, the overall noise resistance is significantly improved.

Finally, in step S504, a motion signal is generated according to the detection result signal.

On condition that it is assured that nobody is touching the metal sensors, the average discharge time reference value $T_{ref}$ for each detecting sensor is first calculated using the methods described in the steps S502, S503, i.e., the detecting sensor being connected to an operating voltage $V_{cc}$ (the first voltage) and the other metal sensors being connected to a ground voltage GND (the second voltage). Then, the detecting sensor is floated; meanwhile, the other metal sensors are connected to the operating voltage $V_{cc}$. The average discharge time reference value $T_{ref}$ of each detecting sensor is also calculated according to the voltage of the detecting sensor and the predetermined reference voltage $V_{ref}$.

In step 503, in the case that it is unknown whether anybody is touching the metal sensors, while starting to detect, the detection unit 330 respectively calculates, in turn, the discharge time period $T_{con}$ for each detecting sensor which discharges down to the predetermined reference voltage $V_{ref}$. Based on whether the time differences between the discharge time periods $T_{con}$ for the metal sensors and the average discharge time reference value $T_{ref}$ are greater than a threshold time period $T_{th}$ (error range), the detection unit 330 determines if somebody is touching the metal sensors. If any of the time differences between the discharge time periods $T_{con}$ related to the detecting sensors respectively and the average discharge time reference value $T_{ref}$ are larger than the threshold time period $T_{th}$, it indicates that a human body is touching at least one of the metal sensors and the detection unit 330 will enable the detection result signal. On the other hand, if all the time differences between the discharge time periods $T_{con}$ related to the detecting sensors respectively and the average discharge time reference value $T_{ref}$ are less than the threshold time value $T_{th}$, it indicates that nobody is touching the metal sensors and the detection unit 330 will disable the detection result signal. In the meantime, the motion detection system 300 adjusts the average discharge time reference value $T_{ref}$ and the predetermined reference voltage $V_{ref}$ according to the discharge time periods $T_{con}$ related to the detecting sensors respectively. By virtue of the influence of the external environmental factors, such as the different equivalent capacitance value for each individual or the background difference of the measurement environment, the average discharge time reference value $T_{ref}$ and the predetermined reference voltage $V_{ref}$ need to be dynamically adjusted to prevent from malfunction or mis-trigger.

The operation of the motion detection system 300 in the step S504 is further described by the following example. Assuming that the motion detection system 300 includes only 4 metal sensors, i.e., n=4, the control unit 340 sets a corresponding bit to 1 while having received the enabled detection result signal; otherwise, the control unit 340 sets the corresponding bit to 0. If the bit combination after the first iteration is 1000, the motion detection system 300 detects that somebody is touching the metal sensor 301 but does not touch the other metal sensors. The bit combination after the second iteration is 0100. Then, the bit combinations after the third iteration and the fourth iteration are 0010, 0001, respectively. Based on the variations of those bit combinations, the control unit 340 detects a user's hand's having slid from the metal sensor 301 all the way to the metal sensor 304, then determines that the motion phenomenon actually occurs and finally generates a motion signal. The motion signal may include a motion orientation or other optional information (such as no movement) etc. Responding to the motion signal, the system may perform relevant post-processing, such as volume control.

It should be noted that the detecting sensor is charged first and discharges according to the above-mentioned method. Afterwards, the other metal sensors are charged for measuring the discharge time $T_{con}$ that the detecting sensor discharges from the voltage $V_{con}$ down to the predetermined reference voltage $V_{ref}$.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A motion detection system, comprising:
    a touch panel having a plurality of metal sensors, wherein each of the metal sensors in turn is set as a detecting sensor;
    a plurality of switching units, electrically connected to the metal sensors respectively, each of the switching units either floating or connecting correspondingly the metal sensor to a first voltage or a second voltage according to a control signal, wherein, during a charge stage, a selected one of the metal sensors which is activated as the detecting sensor is connected to the first voltage and the other metal sensors are connected to the second voltage, and during a detecting stage, the detecting sensor is floated and the other metal sensors are connected to the first voltage;
    a detection unit, for calculating a discharge time of the detecting sensor and generating a detection result signal during the detecting stage according to the control signal, a voltage of the detecting sensor and a predetermined reference voltage; and
    a control unit, for generating the predetermined reference voltage, the control signal and a motion signal according to the detection result signal.

2. The motion detection system according to claim 1, wherein the first voltage is an operating voltage and the second voltage is a ground voltage.

3. The motion detection system according to claim 1, wherein the first voltage is a ground voltage and the second voltage is an operating voltage.

4. The motion detection system according to claim 1, wherein the detection unit comprises a plurality of voltage detectors connected to the metal sensors respectively.

5. The motion detection system according to claim 1, wherein the detection unit comprises:
    a multiplexer for outputting the voltage of the detecting sensor according to the control signal, wherein input terminals of the multiplexer are connected to the metal sensors respectively; and
    a voltage detection unit connected with the output terminal of multiplexer.

6. A motion detection method applied to a touch panel for generating a motion signal, wherein the touch panel, having a plurality of metal sensors, is employed as an input device, the method comprising: setting each of said metal sensors in turn as a detecting sensor;
    connecting a selected one of the metal sensors which is activated as the detecting sensor to a first voltage and the other metal sensors to a second voltage, according to a control signal during a charge stage;
    floating the detecting sensor, connecting the other metal sensors to the first voltage and calculating a discharge time of the detecting sensor to generate a detection result signal according to a voltage of the detecting sensor and a predetermined reference voltage, according to the control signal during a detecting stage; and
    generating the motion signal according to the detection result signal.

7. The motion detection method according to claim 6, wherein the step of floating the detecting sensor comprises:

terminating calculating the discharge time of the detecting sensor if the voltage of the detecting sensor is equal to the predetermined reference voltage.

8. The motion detection method according to claim 7, further comprising: adjusting an average discharge time reference value and the predetermined reference voltage according to the discharge time of each detecting sensor.

9. The motion detection method according to claim 6, wherein the first voltage is an operating voltage and the second voltage is a ground voltage.

10. The motion detection method according to claim 6, wherein the first voltage is a ground voltage and the second voltage is an operating voltage.

11. The motion detection system according to claim 1, wherein the detection unit compares the discharge time with an average discharge time reference value to decide whether to enable the detection result signal.

12. The motion detection system according to claim 11, wherein the average discharge time reference value and the predetermined reference voltage are adjusted according to the discharge time of the detecting sensor.

13. The motion detection method according to claim 6, wherein the step of floating comprises:
    floating the detecting sensor and connecting the other metal sensors to the first voltage;
    calculating the discharge time of the detecting sensor to generate the detection result signal according to the voltage of the detecting sensor and a predetermined reference voltage; and
    comparing the discharge time with an average discharge time reference value to decide whether to enable the detection result signal.

* * * * *